(12) United States Patent
Namekawa et al.

(10) Patent No.: US 8,346,844 B2
(45) Date of Patent: *Jan. 1, 2013

(54) COMMUNICATION APPARATUS, COMMUNICATION SYSTEM, COMMUNICATION METHOD, AND PROGRAM

(75) Inventors: Nobuo Namekawa, Kanagawa (JP); Jun Iwasaki, Tokyo (JP); Satoshi Konya, Kanagawa (JP); Tomonari Yamagata, Kanagawa (JP); Hiroaki Miyachi, Tokyo (JP)

(73) Assignee: Sony Corporation, Tokyo (JP)

( * ) Notice: Subject to any disclaimer, the term of this patent is extended or adjusted under 35 U.S.C. 154(b) by 462 days.

This patent is subject to a terminal disclaimer.

(21) Appl. No.: 12/470,634

(22) Filed: May 22, 2009

(65) Prior Publication Data

US 2009/0290027 A1 Nov. 26, 2009

(30) Foreign Application Priority Data

May 26, 2008 (JP) ................ P2008-136916

(51) Int. Cl.
 *H04N 5/25* (2006.01)
(52) U.S. Cl. ........ 709/201; 709/227; 709/226; 455/425; 455/563
(58) Field of Classification Search ................. 709/201, 709/226, 227; 208/201; 455/425, 563
 See application file for complete search history.

(56) References Cited

U.S. PATENT DOCUMENTS

| | | | |
|---|---|---|---|
| 6,459,911 B1 * | 10/2002 | Hijii | 455/563 |
| 2001/0031634 A1 * | 10/2001 | Mizutani et al. | 455/425 |
| 2003/0140147 A1 * | 7/2003 | Gavish et al. | 709/227 |
| 2005/0185991 A1 * | 8/2005 | Iwakura et al. | 399/299 |
| 2006/0140393 A1 * | 6/2006 | Laberteaux | 379/406.01 |
| 2007/0120678 A1 * | 5/2007 | Posamentier | 340/572.7 |
| 2007/0147854 A1 * | 6/2007 | Yamada | 399/12 |
| 2007/0288680 A1 * | 12/2007 | Tominaga et al. | 710/313 |
| 2008/0125036 A1 * | 5/2008 | Konya et al. | 455/41.1 |
| 2008/0153416 A1 * | 6/2008 | Washiro | 455/41.1 |
| 2008/0163285 A1 * | 7/2008 | Tanaka et al. | 725/25 |

FOREIGN PATENT DOCUMENTS

| | | |
|---|---|---|
| JP | 2005-63310 | 3/2005 |
| JP | 2005-159958 | 6/2005 |
| JP | 2006-60283 | 3/2006 |

* cited by examiner

*Primary Examiner* — Tesfay Yohannes
(74) *Attorney, Agent, or Firm* — Finnegan, Henderson, Farabow, Garrett & Dunner, LLP

(57) ABSTRACT

A communication apparatus of the present invention includes a transmission/reception coupler for performing a one-to-one communication at short distance with an apparatus of a communication opponent by electric field coupling or magnetic field coupling; a plural copy mode setting unit for setting a plural copy mode for transferring a data file to a plurality of apparatuses; a data file selecting unit for selecting a data file to transfer to the plurality of apparatuses; a file transfer processing unit for transferring the data file already selected in the data file selecting unit to an apparatus, which communication is established, when the plural copy mode is set; and a plural copy mode canceling unit for canceling the plural copy mode.

9 Claims, 6 Drawing Sheets

FIG. 6

COMMUNICATION APPARATUS, COMMUNICATION SYSTEM, COMMUNICATION METHOD, AND PROGRAM

BACKGROUND OF THE INVENTION

1. Field of the Invention

The present invention relates to a communication apparatus, a communication system, a communication method, and a program.

2. Description of the Related Art

Nowadays, electric wave communication method defined in IEEE (Institute of Electrical and Electronic Engineers) 802.11 is widely used.

A communication method of performing communication using electric field coupling and magnetic field coupling has been proposed other than the electric wave communication method. In such communication method, when a plurality of couplers for performing magnetic field coupling are brought close, the plurality of couplers magnetic field couple, and such magnetic field coupling realize the communication among the plurality of couplers. The technique of performing communication by magnetic field coupling is described in Japanese Patent Application Laid-Open No. 2006-60283 and the like.

[Patent Document 1] Japanese Patent Application Laid-Open No. 2006-60283

SUMMARY OF THE INVENTION

However, when performing one-to-one communication between two devices using such communication methods, the same data file may not be transmitted all at once to a plurality of devices. Thus, even when transferring the same data file, the task of bringing close the device of the transmission destination one at a time to the device of the transmission source to establish connection, and transferring data is desired. A complex operation of establishing the connection with the next device after completing data transfer to one device, and again selecting the file to transfer and performing data transfer becomes necessary.

The present invention addresses the above-identified, and other issues associated with conventional methods and apparatuses, and it is desirable to provide a new and improved communication apparatus capable of transferring data file without performing a complex process when transferring the data file to a plurality of devices by one-to-one communication of short distance, a communication system, a communication method, and a program.

According to an embodiment of the present invention, there is provided a communication apparatus including a communication unit for performing a one-to-one communication at short distance with an apparatus of a communication opponent by electric field coupling or magnetic field coupling; a plural transfer mode setting unit for setting a plural transfer mode for transferring a data file to a plurality of apparatuses; a data file selecting unit for selecting a data file to transfer to the plurality of apparatuses; a transfer processing unit for transferring the data file already selected in the data file selecting unit to an apparatus, which communication is established, when the plural transfer mode is set; and a plural transfer mode canceling unit for canceling the plural transfer mode.

An input unit input with transfer number of times of the data file may be further arranged, wherein the plural transfer mode canceling unit may cancel the plural transfer mode when transfer number of times of the data file by the transfer processing unit reaches the transfer number of times input to the input unit.

An input unit input with a cancel command of the plural transfer mode may be further arranged, wherein the plural transfer mode canceling unit may cancel the plural transfer mode when the cancel command is input to the input unit.

A time counter for determining whether or not time-out occurred may be further arranged, wherein the plural transfer mode canceling unit may cancel the plural transfer mode when the time-out occurred.

A display processing unit for displaying setting or canceling of the plural transfer mode may be further arranged.

An ID holding unit for holding an ID of an apparatus already transferred with the data file; a connection establishment processing unit for comparing an ID of a device, which connection is established, and an ID of an apparatus already transferred with the data file when connection is established with the apparatus of the communication opponent; and a display processing unit for displaying an error message when the ID of the apparatus, which connection is established, and the ID of the apparatus already transferred with the data file match may be further arranged.

The connection establishment processing unit may cancel the connection with the apparatus, which connection is established, when the ID of the apparatus, which connection is established, and the ID of the apparatus already transferred with the data file match.

According to another embodiment of the present invention, there is provided a communication system including a first communication apparatus for performing a communication with a second communication apparatus by a one-to-one communication at short distance by electric field coupling or magnetic field coupling; and a second communication apparatus including a plural transfer mode setting unit for setting a plural transfer mode for transferring a data file to a plurality of apparatuses, a data file selecting unit for selecting a data file to transfer to the plurality of apparatuses, a transfer processing unit for transferring the data file already selected in the data file selecting unit to an apparatus, which communication is established, when the plural transfer mode is set, and a plural transfer mode canceling unit for canceling the plural transfer mode.

According to another embodiment of the present invention, there is provided a communication method including the steps of: performing a one-to-one communication at short distance with an apparatus of a communication opponent by electric field coupling or magnetic field coupling; setting a plural transfer mode for transferring a data file to a plurality of apparatuses; selecting a data file to transfer to the plurality of apparatuses; transferring the data file already selected to an apparatus, which communication is established, when the plural transfer mode is set; and canceling the plural transfer mode.

According to another embodiment of the present invention, there is provided a program for causing a computer to function as a unit for performing a one-to-one communication at short distance with an apparatus of a communication opponent by electric field coupling or magnetic field coupling; a unit for setting a plural transfer mode for transferring a data file to a plurality of apparatuses; a unit for selecting a data file to transfer to the plurality of apparatuses; a unit for transferring the data file already selected to an apparatus, which communication is established, when the plural transfer mode is set; and a unit for canceling the plural transfer mode.

According to the present invention, the data file can be transferred without performing a complex process when transferring the data file to a plurality of devices by a short distance one-to-one communication.

DETAILED DESCRIPTION OF THE PREFERRED EMBODIMENTS

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Figure 1:
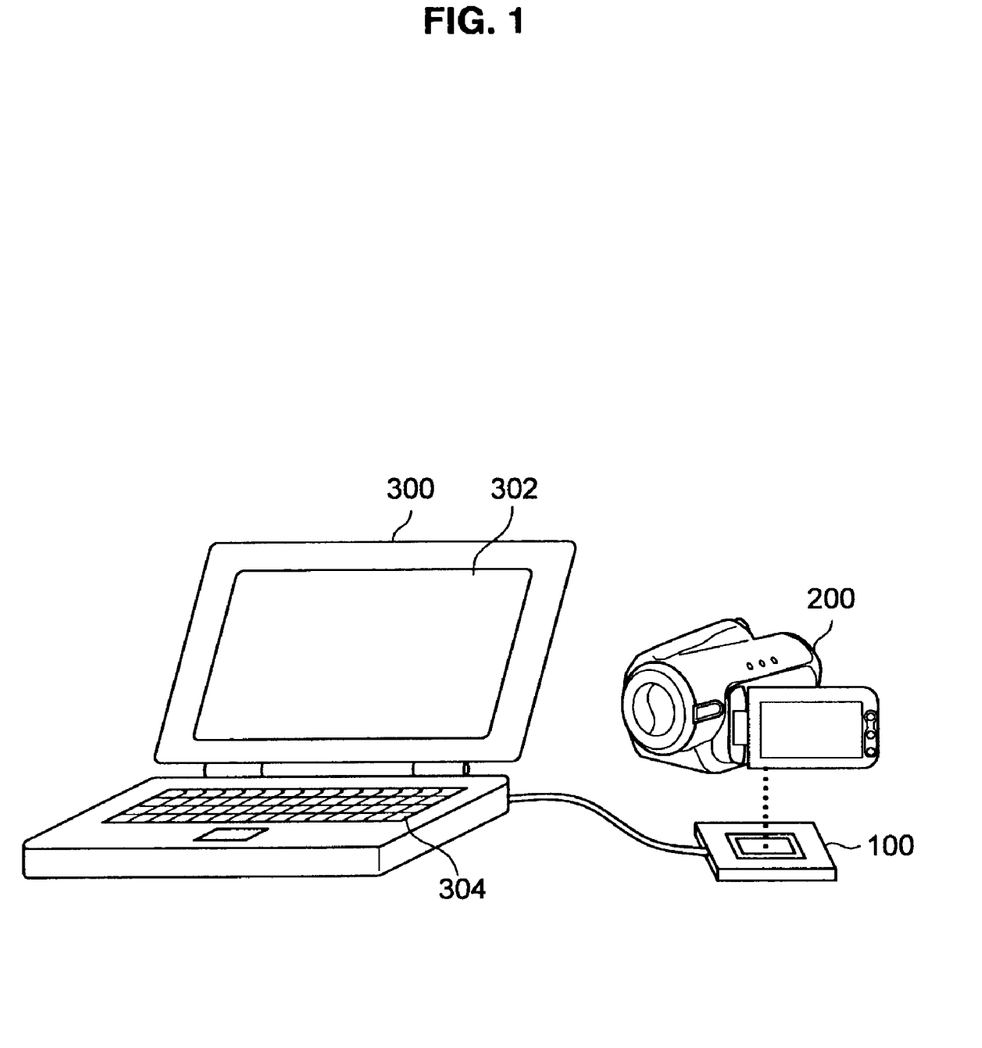
FIG. 1 is an explanatory view showing a communication system according to one embodiment of the present invention.

An outline of a communication system according to one embodiment of the present invention will be first described with reference to FIGS. 1 and 2. FIG. 1 is an explanatory view showing a communication system according to one embodiment of the present invention. As shown in FIG. 1, a communication system according to the present embodiment includes a pair of devices (communication apparatus) including a communication device 100 and a mobile device 200 (video camera), and an information processing apparatus (notebook personal computer) 300. The communication device 100 and the mobile device 200 include an electrode plate called an electric field coupler capable of electric field coupling with each other. The information processing apparatus 300 includes a display unit 302 such as liquid crystal display LCD and a keyboard 304. When the electric field couplers of both the communication device 100 and the mobile device 200 are brought close to within 3 cm, for example, the change in induction electric field generated by one electric field coupler is sensed by the other electric field coupler, so that a one-to-one electric field communication is realized between the communication device 100 and the mobile device 200.

More specifically, one of the pair of devices for performing the electric field communication functions as an initiator and the other device functions as a responder. The initiator is the side making the connection establishment request, and the responder is the side waiting for the connection establishment request from the initiator.

For instance, if the mobile device 200 shown in FIG. 1 functions as the initiator, and the communication device 100 functions as the responder, the communication device 100 receives the connection establishment request (connection request frame) transmitted from the mobile device 200 when the mobile device 200 and the communication device 100 are brought close. When the communication device 100 receives the connection establishment request, the communication device 100 transmits a connection response permission (connection response frame) to the mobile device 200. The connection of communication between the communication device 100 and the mobile device 200 is established when the mobile device 200 receives the connection response permission. After the connection is established, or at the same time as the establishment of the connection, the communication device 100 and the mobile device 200 perform an authentication process, where the communication device 100 and the mobile device 200 are in a data communicable state if the authentication process is normally terminated. The authentication process may be version of software, data transfer method, check of whether or not the protocol and the like of each device complies between the communication device 100 and the mobile device 200, and the like.

Subsequently, the communication device 100 and the mobile device 200 perform data communication at one-to-one. More specifically, the mobile device 200 transmits arbitrary data to the communication device 100 by electric field coupler, and the communication device 100 outputs the data received from the mobile device 200 to the information processing apparatus 300. Alternatively, arbitrary data is input from the information processing apparatus 300 to the communication device 100, and the communication device 100 transmits the data input from the information processing apparatus 300 to the mobile device 200 by electric field coupler. The arbitrary data may be music data such as music, lecture, and radio program, image data such as movie, television program, video program, photo, document, picture, and graph, game, software, and the like.

The electric wave radiated from the antenna of electric wave communication type attenuates inversely proportional to the square of the distance, whereas the intensity of the induction electric field generated from the electric field coupler is inversely proportional to the fourth square of the distance, and thus the distance between a pair of devices capable of performing electric field communication can be limited, which is advantageous. In other words, according to such electric field communication, effects such as the degradation of the signal by an obstacle existing at the periphery is small, and the technique for ensuring hacking and confidentiality can be simplified can be obtained.

The electric wave radiated from the antenna has horizontal wave component that vibrates in a direction orthogonal to the advancing direction of the electric wave, and has polarized wave. The electric field coupler has vertical wave component that vibrates in the advancing direction, and generates the induction electric field without polarized wave, and thus high convenience is obtained in that the signal can be received on the reception side if the surfaces of the pair of electric field couplers are facing each other.

In the present specification, an example in which a pair of communication apparatuses performs short distance wireless communication (non-contact communication, Tranfser Jet) using the electric field coupler will be centrally described, but the present invention is not limited to such example. For instance, the pair of communication apparatuses can perform the short distance wireless communication through a communication unit capable of communicating by magnetic field coupling. According to the communication method using the electric field coupling or the magnetic field coupling, the signal is not transmitted if the communication opponent is not proximate, and thus such method is more advantageous than the electric field communication in that the issue of interference is less likely to occur.

The communication device 100 and the mobile device 200 are shown as one example of the communication apparatus in FIG. 1, but the present invention is not limited thereto. For instance, the communication apparatus may be an information processing apparatus such as PC (Personal computer), home image processing device (DVD recorder, video cassette recorder, etc.), mobile telephone, PHS (Personal Handyphone System), portable music reproducing apparatus, portable image processing apparatus, PDA (Personal Digital Assistants), home game equipment, portable game equipment, or home electronics. In FIG. 1, the communication device 100 is connected to the information processing apparatus 300, but the information processing apparatus 300 and the communication device 100 may be integrally configured.

Figure 2:
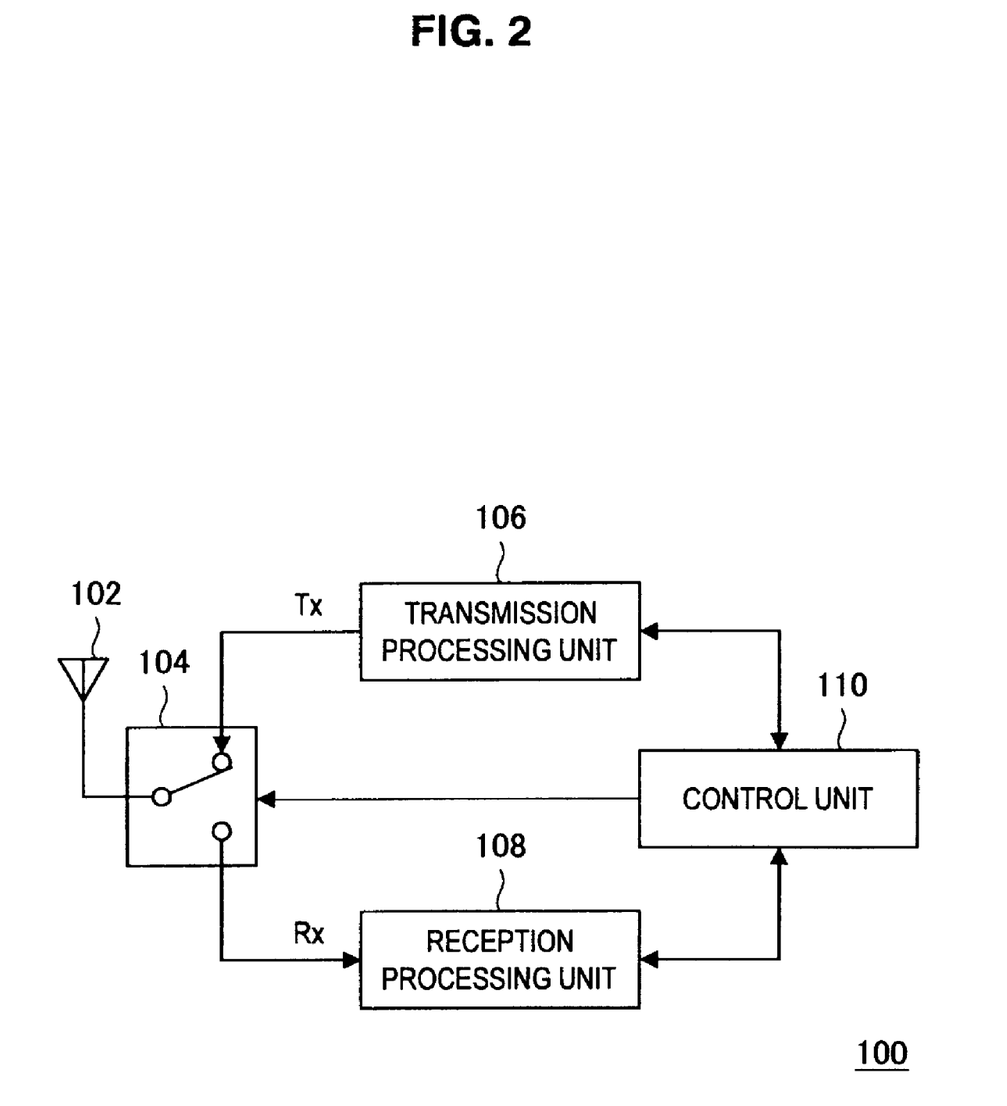
FIG. 2 is a schematic view describing a configuration of a communication device.

FIG. 2 is a schematic view describing a configuration of the communication device 100. The configuration shown in FIG. 2 is similarly configured in both the communication device 100 and the mobile device 200, and thus the mobile device 200 also has the configuration shown in FIG. 2.

As shown in FIG. 2, the communication device 100 includes a transmission/reception coupler (communication unit) 102, a selector 104, a transmission processing unit 106, a reception processing unit 108, and a control unit 110. The transmission/reception coupler 102 is configured from an electric field coupler, and communicates with a transmission/reception coupler of the mobile device 200 by electric field coupling. The transmission/reception couplers 102 of the communication device 100 and the mobile device 200 are arranged facing each other at a short distance of about 3 cm, and can statically couple. The transmission/reception coupler 102 is selectively connected to either the transmission processing unit 106 or the reception processing unit 108 by way of the selector 104.

The transmission processing unit 106 generates a transmission signal to transmit from the transmission/reception coupler 102 to the mobile device 200. The transmission processing unit 106 includes constituent elements such as a coder for coding the transmission data, a diffuser for diffusing the transmission data, a mapper for extending the transmission data to a complex number signal from a binary sequence, and an RF circuit for performing up-conversion to the center frequency. The reception processing unit 108 decodes the reception signal received by the transmission/reception coupler 102. The reception processing unit 108 includes constituent elements such as an RF circuit input with the reception signal, an AD conversion unit for converting the reception signal to a digital signal, a demapper for demapping the reception signal, and a decoder. When a transmission request is made from a higher-level application, the transmission processing unit 106 generates a high frequency transmission signal such as UWB signal based on the transmission data, and propagates the signal from the transmission/reception coupler 102 to the mobile device 200. The transmission/reception coupler 102 on the mobile device 200 side performs demodulation and decoding process on the received high frequency signal, and hands over the reproduced data to the higher-level application. Similar process is performed when sending the data from the mobile device 200 side to the communication device 100. Therefore, bidirectional communication is realized between the communication device 100 and the mobile device 200.

For instance, according to the communication method using high frequency and wide band such as the UWB communication, the ultra-high speed data transfer of about a few hundred Mbps can be realized at short distance. When performing the UWB communication by static coupling instead of the electric wave communication, a very weak electric wave that does not require license of the radio station can be obtained by suppressing the electric field intensity (intensity of electric wave) at the distance of three meters from the radio facility to lower than or equal to a predetermined level as the electric field intensity is inversely proportional to the fourth square, and the communication system can be inexpensively configured. When performing data communication at ultra-short distance by the static coupling method, the quality of the signal does not lower by the reflector existing at the periphery, the hacking on the transmission path can be reliably prevented, and the confidentiality can be ensured. A configuration in which two devices are not able to simultaneously communicate to one device can be obtained by suppressing the electric field intensity to lower than or equal to a predetermined level, and enabling communication only in the distance within 3 cm, whereby the one-to-one communication at short distance can be realized.

The control unit 110 controls the overall operation of the communication device 100. For instance, the control unit 110 controls the generation of the transmission signal by the transmission processing unit 106, and controls decoding of the reception signal by the reception processing unit 108. The control unit 110 outputs a switch signal to the selector 104 to connect the transmission/reception coupler 102 and the transmission processing unit 106 when transmitting connection request frame, the data file and the like to the mobile device 200. The control unit 110 outputs a switch signal to the selector 104 to connect the transmission/reception coupler 102 and the reception processing unit 108 when waiting for the connection request frame, the data file, and the like from the mobile device 200.

The establishment of the connection is realized when one device (initiator) transmits a connection request frame C-Req to the other device (responder), and the initiator receives a connection response frame C-Acc transmitted from the responder. The connection request frame is transmitted, for example, from the device on the side input with user action such as data file transfer and data file selection to the communication opponent. In the system of the present embodiment, when the connection between the communication device 100 and the mobile device 200 is established, both the communication device 100 and the mobile device 200 do not establish connection with another device. Therefore, one-to-one communication is performed between the communication device 100 and the mobile device 200.

A plural copy mode (plural transfer mode) according to the present embodiment will now be described. The plural copy mode is used when transferring (copying) an arbitrary data file held by the information processing apparatus 300 to a plurality of mobile devices 200. The data file to transfer may be a single data file, or a data file group including plural data files. The plural copy mode can be used when copying image data and the like held by one communication device 100 (information processing apparatus 300) to a plurality of mobile devices 200, thereby enabling the owner of each mobile device 200 to share the image data.

Assuming the one-to-one communication at short distance as in the present embodiment, the same data file may not be transmitted to a plurality of mobile devices 200 all at once. Thus, even when transferring the same data file to a plurality of mobile devices 200, the task of brining close the mobile device 200 one at a time to establish a connection, and transferring the data is desired. After the data transfer to one mobile device 200 is completed, a complex operation of establishing a connection with the next mobile device 200, again selecting the file to transfer, and transferring the data is desired.

Thus, in the present embodiment, when transferring data to a plurality of mobile devices 200, the plural copy mode is set and the data file to transfer is selected. In a state the plural copy mode is set, the selected state of the data file to be transferred is maintained even after the data transfer to one mobile device 200 is completed. Therefore, the data file to transfer may not be selected each time at the information processing apparatus 300 when transferring the data file to the plurality of mobile devices 200, and the data file can be copied to the plurality of mobile devices 200 by sequentially approaching the mobile device 200 of data transfer destination to the communication device 100.

Figure 3:
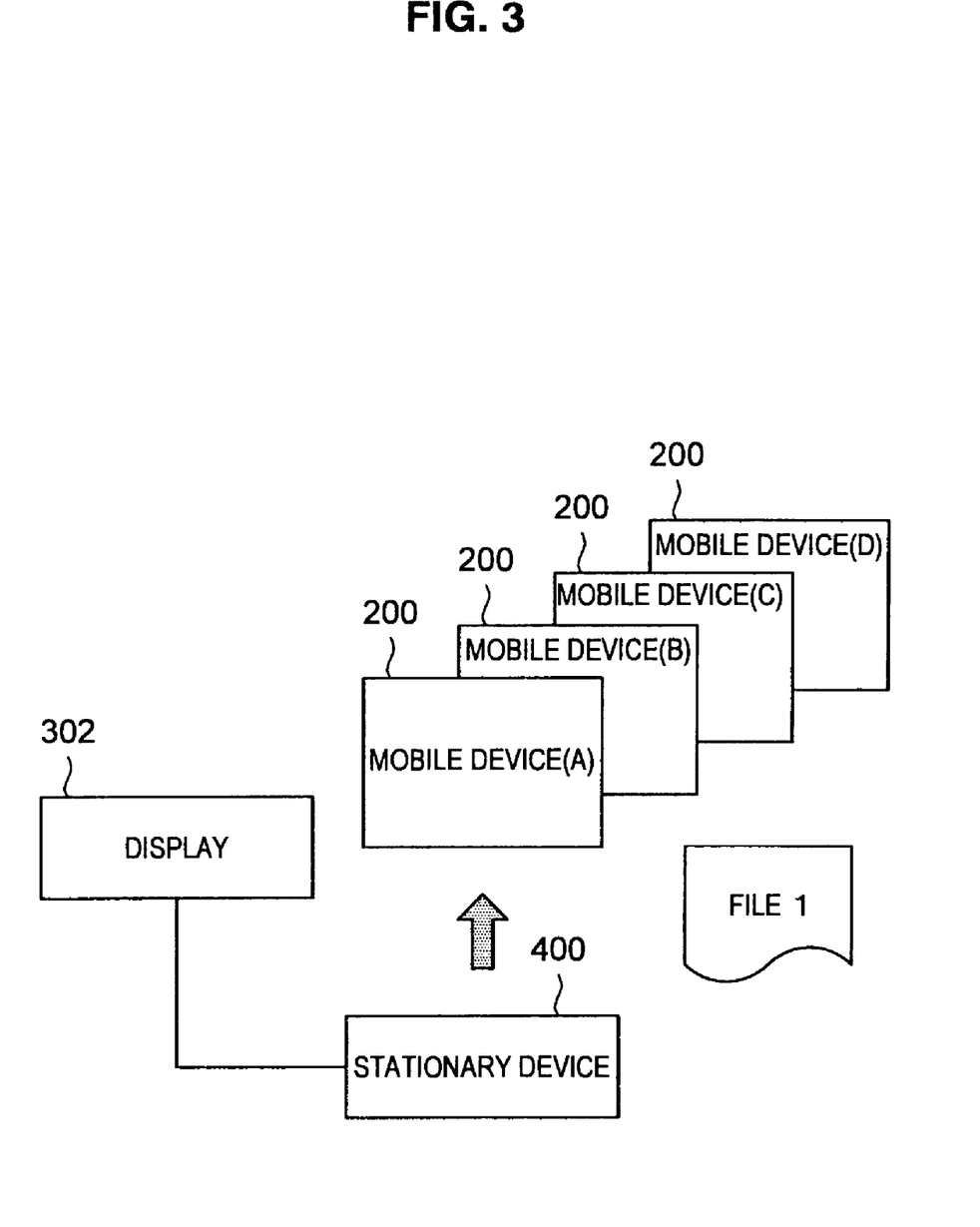
FIG. 3 is a schematic view showing a state of transferring a data file by plural copy mode.

FIG. 3 is a schematic view showing a state of transferring a data file in the plural copy mode. In the following description, the communication device 100 and the information processing apparatus 300 are configured as an integrated stationary device 400. In the following description, an example of copying the data file from the stationary device 400 to a plurality of mobile devices 200 is described, but the data file may be copied from one mobile device to a plurality of mobile devices. The data file may also be copied from one mobile device to a plurality of stationary devices.

As shown in FIG. 3, in the one-to-one communication at short distance, the device is sequentially brought close to establish a connection for every device when copying the data file 1 from the stationary device 400 side to a plurality of mobile device (A) 200, mobile device (B) 200, mobile device (C) 200, and mobile device (D) 200. In the present embodiment, the mode of the stationary device 400 is set to the plural copy mode. Thus, until the data transfer to each mobile device (A) to (D) is completed, the state in which the file 1 is selected as the data file to be transferred is maintained in the stationary device 400. Therefore, the file 1 can be copied to each mobile device 200 by simply approaching the mobile device (A) 200, the mobile device (B) 200, the mobile device (C) 200, and the mobile device (D) 200 sequentially to the stationary device 400.

Figure 4:
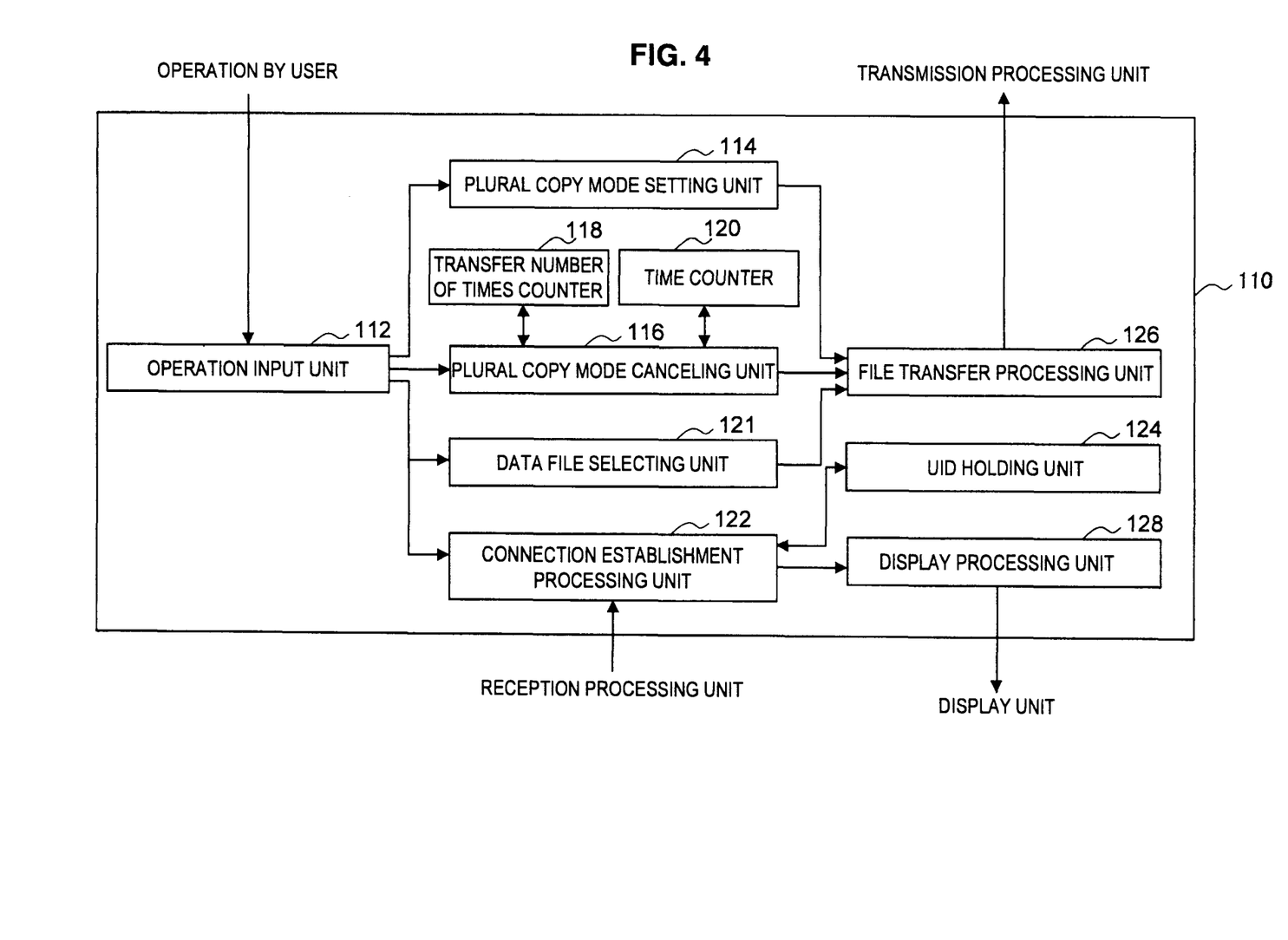
FIG. 4 is a block diagram showing a function configuration of a control unit.

FIG. 4 is a block diagram showing a function configuration of the control unit 110. As shown in FIG. 4, the control unit 110 includes an operation input unit 112, a plural copy mode setting unit 114, a plural copy mode canceling unit 116, a transfer number of times counter 118, a time counter 120, a data file selecting unit 121, a connection establishment processing unit 122, a unique ID (UID) holding unit 124, a file transfer processing unit 126, and a display processing unit 128. The function blocks shown in FIGS. 2 and 4 can be configured by hardware (circuit) or calculation processing unit (CPU) and software (program) for functioning the same. If the function blocks are configured by the calculation processing unit and software, the program can be stored in a recording medium such as a memory arranged in the communication device 100 and the mobile device 200.

Figure 5:
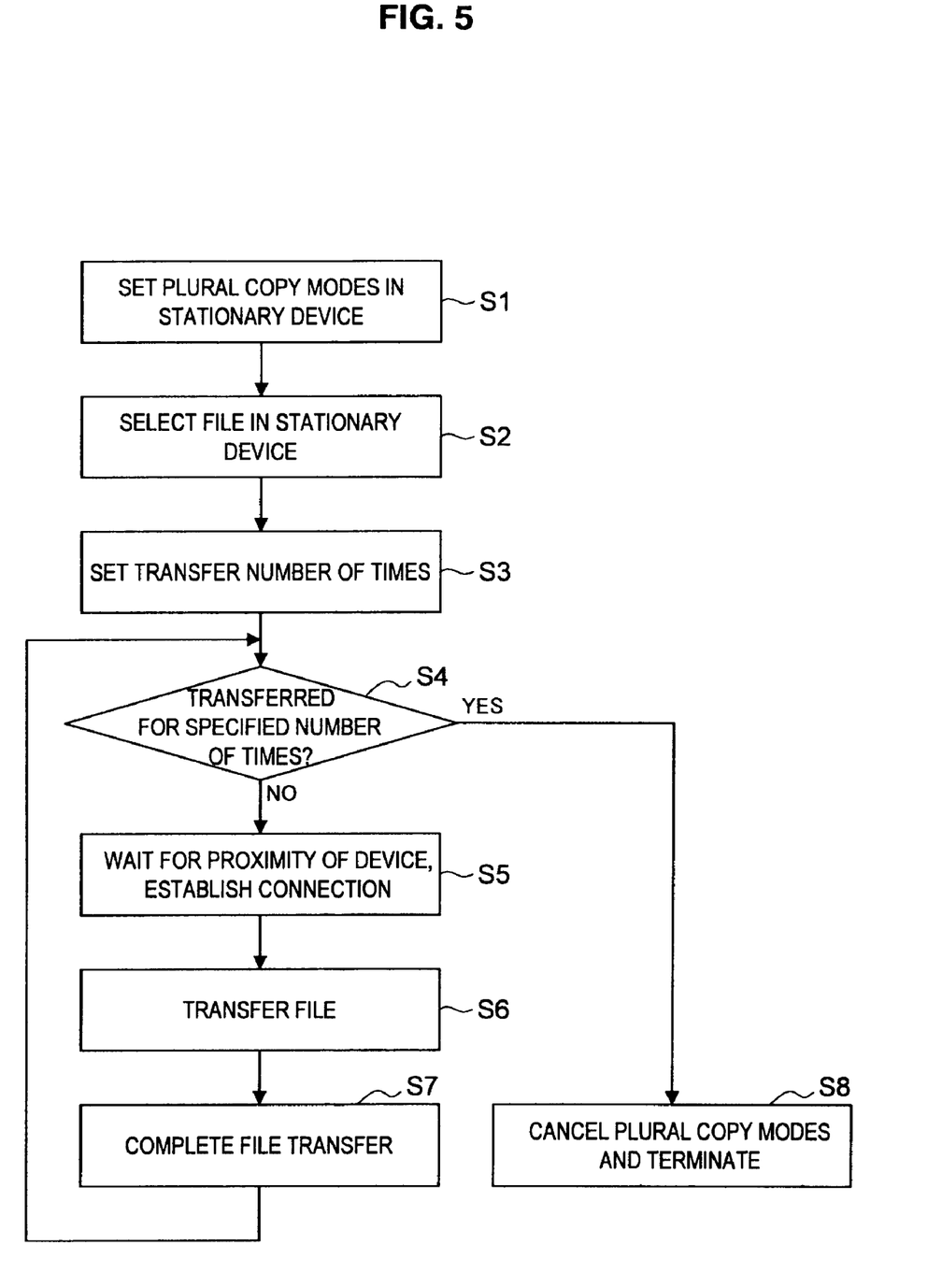
FIG. 5 is a flowchart showing the process of the plural copy mode.

The process of the plural copy mode realized by the configuration of the above-describe control unit 110 will now be described. FIG. 5 is a flowchart showing the process of the plural copy mode. First, in step S1, the plural copy mode is set by the keyboard operation of the user at the stationary device 400. The keyboard operation is input to the operation input unit 112. In step S2, the data file to transfer to the plurality of mobile devices 200 is selected by the data file selecting unit 121 based on the keyboard operation of the user.

In step S3, the transfer number of times is set by the keyboard operation of the user. Here, the number of mobile devices 200, which is the copy destination of the data file is input by the keyboard operation, and set as the transfer number of times.

In step S4, it is determined whether or not the data transfer of the number of times specified in step S3 has been performed by the transfer number of times counter 118. If the transfer of the specified number of times has not been performed, the plural copy mode is maintained. In this case, the mobile device 200 to which the data file is not transferred is brought close to the stationary device 400 by the user, and the connection is established by the connection establishment processing unit 122 in step S5. If the plural copy mode is maintained, the user is urged to bring the next mobile device 200 close, and such notification is displayed on the display unit 302 by the display processing unit 128. The number of mobile devices 200 to which the data transfer is completed is displayed on the display unit 302 by the display processing unit 128. The user then can recognize how many of the plurality of mobile devices 200 have been transferred with data. In step S6, the data transfer is carried out by the file transfer processing unit 126 with respect to the mobile device 200 which connection is established.

After the transfer of data file is completed in step S7, the process returns to step S4, and whether or not the data transfer of the number of times specified in step S3 has been performed is again determined. The processes after step S5 are again performed if the transfer of the specified number of times is not completed.

If the transfer of the specified number of times is completed, the notification that the data transfer of the specified number of times has been performed is provided to the plural copy mode canceling unit 116 by the transfer number of times counter 118. In this case, the process proceeds to step S8, the plural copy mode is canceled by the plural copy mode canceling unit 116, and the process is terminated. When the plural copy mode is canceled, such notification is displayed on the display unit 302 by the display processing unit 128.

According to the process of FIG. 5, when the plural copy mode is set, the data file transfer to the plurality of mobile devices 200 can be sequentially carried out by simply selecting the data file to transfer once. Therefore, the operation of specifying the data file to transfer every time the connection with the mobile device 200 is established becomes unnecessary. Thus, until the data transfer of the specified number of times is performed, the data transfer to each mobile device 200 can be carried out by simply approaching the plurality of mobile devices 200 sequentially to the stationary device 400. After the data transfer of the specified number of times is completed, the plural copy mode is terminated, and the mode can be returned to the normal mode.

Figure 6:
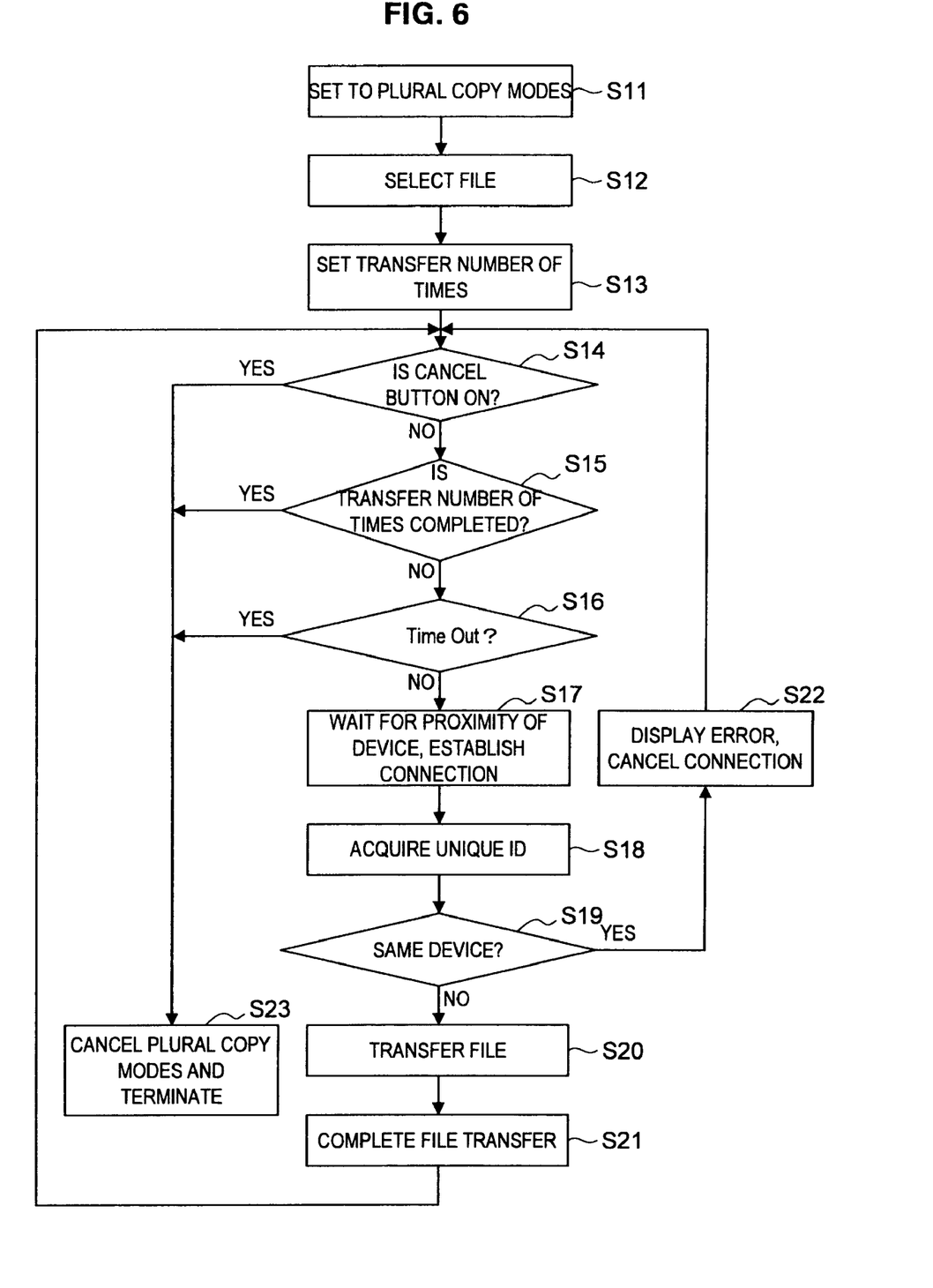
FIG. 6 is a flowchart showing a more detailed example of the data transfer in the plural copy mode.

A more specific example of the data transfer in the plural copy mode will be described based on the flowchart of FIG. 6. In the process of FIG. 6, the plural copy mode is terminated when the plural copy mode is canceled by the user and when time-out occurred in addition to when the data transfer of the specified number of times is terminated. When acquiring a unique ID of the mobile device 200 of the data transfer destination and again transferring the data to the same mobile device 200, a warning is displayed on the display screen.

The processes of steps S11 to S13 are similar to the processes of steps S1 to S3 of FIG. 5. First, in step S11, the plural copy mode is set by the keyboard operation of the user at the stationary device 400. The keyboard operation is input to the operation input unit 112. In step S12, the data file to transfer to the plurality of mobile devices 200 is selected by the keyboard operation of the user.

In step S13, the transfer number of times is set by the keyboard operation of the user. Here, the number of mobile devices 200, which is the copy destination of the data file is input by the keyboard operation, and set as the transfer number of times.

In step S14, whether or not the cancel button of the plural copy mode is turned ON by the operation of the user is determined. The cancel button may be any one of the keys of the keyboard. When the cancel button is turned ON, such fact is input to the operation input unit 112 and notified to the plural copy mode canceling unit 116. In this case, the plural copy mode is canceled by the plural copy mode canceling unit 116, and the process is terminated in step S23.

When the cancel button is not turned ON in step S14, the process proceeds to step S15. In step S15, whether or not the data transfer of the number of times specified in step S13 has been performed is determined by the transfer number of times counter 118, similar to step S4 of FIG. 5. If the transfer of the specified number of times is completed, notification that the data transfer of the specified number of times has been performed is made to the plural copy mode canceling unit 116 by the transfer number of times counter 118. In this case, the process proceeds to step S23, the plural copy mode is canceled by the plural copy mode canceling unit 116, and the process is terminated.

If the transfer of the specified number of times has not been performed in step S15, the process proceeds to step S16. In step S16, whether or not time-out occurred is determined by the time counter 120. Here, time-out occurs, for example, when a predetermined time has elapsed from the last data transfer or when a predetermined time has elapsed from when the stationary device 400 is operated for the last time. The predetermined time for causing time-out can be set by the user in advance.

If time-out occurred in step S16, notification that the time-out occurred is made to the plural copy mode canceling unit 116 by the time counter 120. In this case, the process proceeds to step S23, the plural copy mode is canceled by the plural copy mode canceling unit 116, and the process is terminated.

If time-out did not occur in step S16, the process proceeds to step S17. In this case, the plural copy mode is maintained since the factors for canceling the plural copy mode did not occur in steps S14 to S16. In this case, the mobile device 200 to which the data file is not transferred is brought close to the stationary device 400 by the user, and the connection is established by the connection establishment processing unit 122 in step S17. In step S18, the unique ID contained in the connection request frame or the connection response frame transmitted and received with the mobile device 200 in connection establishment is acquired by the connection establishment processing unit 122, and temporarily held in the unique ID holding unit 124.

In the next step S19, whether the unique ID acquired in step S18 is the unique ID of the mobile device 200 to which the data file is already transferred is determined. This determination is made by the connection establishment processing unit 122. With respect to the mobile device 200 to which the data file is already transferred, the unique ID thereof is held in the unique ID holding unit 124 by the previous process of step S18. Therefore, in step S19, whether or not the mobile device 200 which connection is established at the current time point is the same device as the mobile device 200 to which data is already transferred can be determined based on the unique ID held in the unique ID holding unit 124.

If the mobile device 200 which connection is currently established is the same device as the mobile device 200 to which data is already transferred in step S19, the process proceeds to step S22. In this case, notification that the data transfer is already performed on the mobile device 200 which connection is currently established is made to the display processing unit 128 by the connection establishment processing unit 122. The display processing unit 128 receiving the notification displays an error message on the display unit 302. The connection with the mobile device 200 which connection is currently established is canceled. Thus, the data file will not be again transferred when the user again brings the mobile device 200, to which the data file is already transferred, close to the stationary device 400 by an accident, and unnecessary data transfer can be avoided.

If determined that the mobile device 200 which connection is established is not the same device as the device to which the data file is already transferred, the process proceeds to step S20. In step S20, the data file is transferred to the mobile device 200, which connection is established, by the file transfer processing unit 126.

After the transfer of the data file is completed in step S21, the process returns to step S14, and the subsequent processes are again performed. When the cancel button is turned ON in step S14, when the transfer number of times is completed in step S15, or when time-out occurred in step S16, the process proceeds to step S23, and the plural copy mode is canceled.

According to the process of FIG. 6, the plural copy mode can be terminated when the plural copy mode is canceled by the user, and when the time-out occurred. Furthermore, when the user accidentally brings the mobile device 200 to which the data file is already transmitted close to the stationary device 400, the error message is displayed on the display unit 302, and the connection establishment is canceled. Therefore, the data file will not be transferred again, and unnecessary data transfer can be avoided.

In the process of FIG. 6, three types of factors of steps S14 to S16 have been described as the factors for canceling the plural copy mode, but only one of the factors for cancellation may be determined to cancel the plural copy mode.

The present application contains subject matter related to that disclosed in Japanese Priority Patent Application JP 2008-136916 filed in the Japan Patent Office on May 26, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A communication apparatus comprising:
   a communication unit for performing a one-to-one communication at short distance with an apparatus of a communication opponent by electric field coupling or magnetic field coupling;
   a plural transfer mode setting unit for setting a plural transfer mode for sequentially transferring a data file to a plurality of apparatuses;
   a data file selecting unit for selecting a data file to transfer to the plurality of apparatuses;
   a transfer processing unit for sequentially transferring the data file already selected in the data file selecting unit to each of the plurality of apparatuses, with which communication is established, when the plural transfer mode is set;
   a plural transfer mode canceling unit for canceling the plural transfer mode; and
   a time counter for determining whether or not time-out occurred,
   wherein the plural transfer mode canceling unit cancels the plural transfer mode when the time-out occurred.

2. The communication apparatus according to claim 1, comprising an input unit for receiving a number of times the data file is to be transferred, wherein
   the plural transfer mode canceling unit cancels the plural transfer mode when the number of times the data file is to be transferred by the transfer processing unit reaches the number of times received by the input unit.

3. The communication apparatus according to claim 1, comprising an input to an input unit with a cancel command of the plural transfer mode, wherein
the plural transfer mode canceling unit cancels the plural transfer mode when the cancel command is input to the input unit.

4. The communication apparatus according to claim 1, comprising a display processing unit for displaying setting or canceling of the plural transfer mode.

5. The communication apparatus according to claim 1, comprising:
an ID holding unit for holding an ID of an apparatus already transferred with the data file;
a connection establishment processing unit for comparing an ID of a device, with which connection is established, and the ID of an apparatus already transferred with the data file when a connection is established with the device; and
a display processing unit for displaying an error message when the ID of the device, with which connection is established, and the ID of the apparatus already transferred with the data file are the same.

6. The communication apparatus according to claim 5, wherein the connection establishment processing unit cancels the connection with the device, with which connection is established, when the ID of the device, with which connection is established, and the ID of the apparatus already transferred with the data file are the same.

7. A communication system comprising:
a first communication apparatus for performing a communication with a second communication apparatus by a one-to-one communication at short distance by electric field coupling or magnetic field coupling; and
a second communication apparatus including a plural transfer mode setting unit for setting a plural transfer mode for sequentially transferring a data file to a plurality of apparatuses, a data file selecting unit for selecting a data file to transfer to the plurality of apparatuses, a transfer processing unit for sequentially transferring the data file already selected in the data file selecting unit to each of the plurality of apparatuses, with which communication is established, when the plural transfer mode is set, a plural transfer mode canceling unit for canceling the plural transfer mode, and a time counter for determining whether or not time-out occurred, wherein the plural transfer mode canceling unit cancels the plural transfer mode when the time-out occurred.

8. A communication method comprising the steps of:
performing a one-to-one communication at short distance with an apparatus of a communication opponent by electric field coupling or magnetic field coupling;
setting a plural transfer mode for sequentially transferring a data file to a plurality of apparatuses;
selecting a data file to transfer to the plurality of apparatuses;
sequentially transferring the data file already selected to each of the plurality of apparatuses, with which communication is established, when the plural transfer mode is set;
determining whether or not time-out occurred; and
canceling the plural transfer mode when the time-out occurred.

9. A non-transitory computer-readable medium comprising a program for causing a computer to function as:
a unit for performing a one-to-one communication at short distance with an apparatus of a communication opponent by electric field coupling or magnetic field coupling;
a unit for setting a plural transfer mode for sequentially transferring a data file to a plurality of apparatuses;
a unit for selecting a data file to transfer to the plurality of apparatuses;
a unit for sequentially transferring the data file already selected to each of the plurality of apparatuses, with which communication is established, when the plural transfer mode is set;
a unit for determining whether or not time-out occurred; and
a unit for canceling the plural transfer mode when the time-out occurred.

* * * * *